April 18, 1967 K. ALTENBURGER 3,314,504
RIM BRAKE
Original Filed Feb. 6, 1962
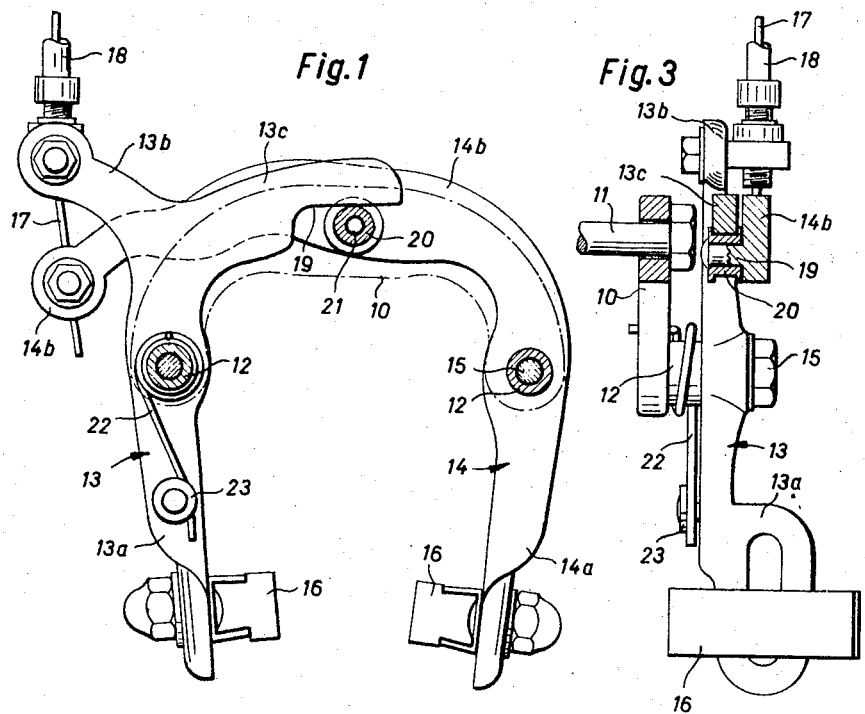
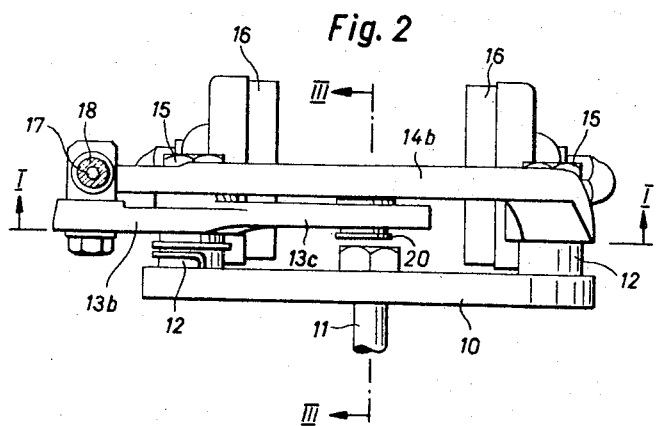
Inventor
K. Altenburger
By
Watson Cole Grindle + Watson
Attys.

United States Patent Office 3,314,504
Patented Apr. 18, 1967

3,314,504
RIM BRAKE
Karl Altenburger, Saar-Strasse 299,
Jestetten, Baden, Germany
Original application Feb. 6, 1962, Ser. No. 171,480. Divided and this application Jan. 11, 1965, Ser. No. 426,470
Claims priority, application Switzerland, Feb. 8, 1961, 1,501/61
2 Claims. (Cl. 188—24)

This application is a division of applicant's co-pending application Serial No. 171,480, filed February 6, 1962, now abandoned.

This invention relates to a rim brake, particularly for bicycles, motorcycles, motor bicycles and the like. As is known, the rim brake comprises two spring-biassed swivable levers, each having an arm which carries a brake block and another arm which is coupled to the actuating means.

Two different types of such brakes have been known for a long time. In one type the two levers carrying the brake blocks are swivably mounted on a common central bolt, and a lateral arm of one of these levers is connected to the wire of a Bowden cable, and an arm of the other lever is connected to the sheath of the Bowden cable which serves as the actuation means to apply the brake. This construction, known under the designation "lateral pull brake," is relatively simple, but involves the disadvantage that the movement of the levers carrying the brake blocks is not always symmetrical with respect to the wheel rim and, as a result, it frequently happens that one brake block lies against the rim whilst the other has already been lifted off the rim. Attempts have been made to eliminate this disadvantage by a suitable design of the spring which tends to lift the brake blocks clear of the rim, but no measures known so far have led to fully satisfactory results.

The other type of rim brake, designated "center pull brake," is characterized in that the two levers carrying the brake blocks are pivoted on two separate bolts which are spaced laterally from each other, and that both levers are connected by means of cables or the like to the wire of a Bowden cable, the sheath of which is supported at a fixed point, say a special holder. In this construction the tension from the wire of the Bowden cable is intended to be applied uniformly to the two levers. This aim, however, is reached only with accurate mounting, and the construction is relatively complicated and ugly mainly due to the aforementioned fixed point for supporting the sheath of the Bowden cable. The advantage over the lateral pull brake is that, with correct mounting, the brake blocks are always pressed symmetrically from both sides against the rim when the brake is applied.

The object of the present invention is to combine the merits of the two aforedescribed types of brakes. The rim brake according to the invention is thus also provided with two levers which carry the brake blocks and are pivoted on separate bolts, characterized in that the two levers are positively coupled to each other at least to their swivelling in the way of mutual approach of the brake blocks and that they are constrained to carry out symmetrical and opposing movements with respect to each other.

Further features of the invention will appear from the following description and claims taken in conjunction with the accompanying drawing wherein there are shown, purely by way of example, several forms of embodiment of the object of invention.

In said annexed drawing:

FIG. 1 shows an embodiment of the rim brake, partly in side elevation and partly in cross-section taken on the line I—I of FIG. 2 in the direction of the arrows;

FIG. 2 is a top view of the rim brake; and

FIG. 3 is a sectional view taken on the line III—III of FIG. 2 in the direction of the arrows.

Referring to FIGS. 1 to 3, the form shown includes a stationary support bracket 10 which is attached at its center section by means of a bolt 11 to the frame of a bicycle or the like. Each end of said bracket has riveted thereto a tapped hollow bolt 12. Two levers 13 and 14 are rockably mounted on the bolts 12 by means of screws 15. One arm 13a and 14a of each lever 13 and 14 respectively carries an adjustable brake block 16. A wheel rim (not shown) lies between the two blocks 16. A second arm 14b of lever 14 is connected to the wire 17 of a Bowden cable of which the sheath 18 is supported on a second arm 13b of lever 13. According to FIG. 1, the two arms 13b and 14b cross each other in such a way that tensioning the wire 17 causes the brake blocks 16 to move towards each other. The other end of the Bowden wire is connected in known manner to a swivably arranged hand lever or bearing block of same (not shown) on the handlebar and serves as a power transmission member for actuating the brake.

One lever 13 carries an additional arm 13c which crosses the arm 14b of the other lever 14 and includes a control cam 19 which is supported on the periphery of a roller 20. The latter is rotatably supported on a pin 21 which is arranged on lever arm 14b, and, upon lever 14 being rocked, moves approximately in a median plane between the two bolts 12. The control cam 19 extends substantially at right angles to said median plane. The lever 13 is under the influence of a spring 22 that is coiled around the bolt 12 on which the lever is supported and is anchored at one end to the stationary support bracket 10. The other end of spring 22 is supported on a roller 23 fixed to lever arm 13a. The spring 22 tends to rock lever 13 so that its brake block 16 moves away from the other and so that the control cam 19 always remains resting on roller 20. Instead of roller 20 on arm 14b, a cam or pin could be provided on which to support the control cam 19.

The action of the aforedescribed rim brake is as follows:

On actuating the hand lever (not shown) the wire 17 of the Bowden cable is tensioned while, simultaneously, a corresponding force of reaction in the sense of a thrust is exerted on the sheath 18 of the cable. The ends of the arms 13b and 14b are thus moved towards each other, this resulting in a pivoting of levers 13 and 14 such that the two brake blocks 16 approach each other. In FIG. 1, the brake is illustrated in this actuated position. Through roller 20 and control cam 19 thereon the levers 13 and 14 are, however, positively coupled to each other during the described pivotal movement in such a manner that they must forcibly carry out a symmetrical opposing movement. With the brake properly mounted the two brake blocks 16 thus always come into contact with the rim simultaneously, so that the same contact pressure results between each brake block and the rim. When the tension on the wire 17 of the Bowden cable ceases upon the hand lever being released, the spring 22 is capable of resetting the lever 13 to its start position, the other lever 14 being also constrained to pivot back to its start position by means of control cam 19 and roller 20. The two brake blocks 16 are thus lifted simultaneously, and always by the same amount off the rim, so that the brake is properly released.

Obviously, the effect of the brake on the wheel rim is the same as with a center pull brake, though the Bowden cable serving as the power transmission member is connected laterally to levers 13, 14 as with the known lateral pull brake. In appearance also the described rim brake is substantially similar to an ordinary lateral pull brake. Furthermore, mounting by means of bolt 11 is exactly as easy as for a lateral pull brake inasmuch as a separate fixed point to support the sheath 18 of the Bowden cable is unnecessary, and the tension of the wire 17 of the Bowden cable does not have to be distributed uniformly to the levers 13, 14 carrying the brake blocks 16.

In practice the described brake has proved much easier to operate than rim brakes known heretofore, so that the rider can obtain an increased braking effect without difficulty. One reason for easier operation is that the pivot axes of levers 13 and 14, namely the bolts 12, lie nearer to the brake blocks 16 than in hitherto known lateral pull brakes in which the levers are pivoted on a common bolt approximately in the position of pin 21, this producing a less favorable ratio of power lever arm to load lever arm for each lever. According to FIG. 1, the power lever arm of lever 13, namely the distance of bolt 12 from the point of attachment of the Bowden cable, is indeed smaller than the corresponding power lever arm of the other lever 14 but, nevertheless, an equal contact pressure of the two brake blocks on the rim results because arm 14b, acting as a one-armed lever, assists the pivotal movement of lever 13, and the two levers 13 and 14 are coupled together.

Another reason for the easiness of operation of the described brake is that the spring 22 is weaker and its tension is easier to overcome on braking. Due to the constrained coupling of the two levers 13 and 14 carrying the brake blocks, the restoring spring can now be of a weaker design than previous springs which, on the brake being released, also have to provide for a somewhat synchronous movement of the levers and thus the two brake blocks.

The better braking effect permits greater delays and shorter braking distances and, consequently, the braking period necessary for any decrease in speed will be shortened, and the heating effect on the rim and tires is reduced. This is of great importance, particularly for racing cyclists since, if the described brake is used, the gummed-on tire will not become detached from the rim and slide thereon or even fly thereoff, as was frequently the case hitherto due to excessive heating. The increased braking effect renders superfluous any special treatment of the lateral surfaces of the rim. In practice, it has been proved that the tires and also the rubber brake blocks are conserved to a considerable extent as compared with brake types known heretofore. The constrained uniform pressure of the brake blocks on either side of the rim prevents rim deformation and vibration in the vehicle during the braking operation.

I claim:

1. Rim brake, particularly for bicycles and the like, comprising two levers swingable on separate bolts, each of said levers having a first arm which carries a brake block and a second arm crossing the corresponding second arm of the other lever, said second arms being connected to a wire and a sheath of a cable for actuating the brake, coupling means for positively coupling the two levers to each other as to their pivoting in the manner of mutual approach of the brake blocks and so that they are constrained to carry out symmetrical and opposing movements with respect to each other, one of said levers having a third arm adjacent the second arm of the other lever, said coupling means including an open downwardly facing control cam and a cam follower means cooperating with said cam, said control cam and said cam follower means being arranged one at said third arm and the other one at said second arm adjacent thereto, said cam follower means being arranged substantially in a median plane between the bolts having said levers pivoted thereon, the control cam extending substantially at right angles to said median plane, said bolts being disposed midway between the cam and follower means and said brake blocks, a stationary bracket carrying the bolts having the levers pivoted thereon, and a single torsion spring associated with at least one lever urging said levers to pivot in a direction for moving said brake blocks away from each other, said stationary bracket being provided with a central fastening bolt for connection with a vehicle frame, and said wire and sheath of the cable being connected to said second arms at points provided in a line substantially parallel with said median plane.

2. Rim brake according to claim 1, wherein one end of said spring is supported on said stationary bracket while the other end of the spring rests against the lever provided with said third arm, said spring being wound about the bolt having said lever with the third arm pivoted thereon.

References Cited by the Examiner

FOREIGN PATENTS

| 393,965 | 11/1908 | France. |
|---|---|---|
| 521,819 | 3/1921 | France. |
| 1,043,421 | 6/1953 | France. |

MILTON BUCHLER, *Primary Examiner.*

B. S. MOWRY, T. W. BUCKMAN, *Assistant Examiners.*